United States Patent
Johari

(10) Patent No.: US 7,984,425 B2
(45) Date of Patent: Jul. 19, 2011

(54) METHOD AND SYSTEM FOR PROCESS DESIGN VALIDATION

(75) Inventor: Gaurav Johari, Uttar Pradesh (IN)

(73) Assignee: SAP AG, Walldorf (DE)

( * ) Notice: Subject to any disclaimer, the term of this patent is extended or adjusted under 35 U.S.C. 154(b) by 1051 days.

(21) Appl. No.: 11/757,433

(22) Filed: Jun. 4, 2007

(65) Prior Publication Data

US 2008/0300813 A1   Dec. 4, 2008

(51) Int. Cl.
  *G06F 9/44* (2006.01)
(52) U.S. Cl. ........................................... 717/120
(58) Field of Classification Search .......... 717/100–102, 717/110–117, 120–126
See application file for complete search history.

(56) References Cited

U.S. PATENT DOCUMENTS

2006/0265690 A1 * 11/2006 Motoyama et al. ........... 717/117

OTHER PUBLICATIONS

Decker et al., "eParticipative Process Learning—process-oriented experience management and conflict solving", 2005, Data & Knowledge Engineer 52, pp. 5-31.*

* cited by examiner

*Primary Examiner* — Ted T Vo

(57) ABSTRACT

A method and system for process design validation is provided. A process validation is first triggered. A process design is evaluated against a technical infrastructure component and if a non-positive result is achieved as a result of process design validation, suggestions are generated in order to achieve a positive result.

22 Claims, 5 Drawing Sheets

METHOD AND SYSTEM FOR PROCESS DESIGN VALIDATION

TECHNICAL FIELD

Embodiments of the invention generally relate to computer systems, and more particularly, to a method and system for process design validation.

BACKGROUND

Process design validation is the task of verifying whether a process design conforms to a specification and works with respect to the existing configurations of an organization's business and technical landscape. The configurations typically include technical infrastructure components such as an authorization framework, a process agent framework, a rule definition framework and an organizational structure framework. The processes that require validation are typically business processes, production processes, software logic designs, electronics design processes and the like. There are various scenarios which require process design validation such as creation of a new process design, a change in an existing process design or a change in one or more technical infrastructure components of an organization.

The current systems and tools available for validation of a process against the business and technical landscape of an organization provide little or no automation in respect of process validation. The processes are ratified manually and tested over long periods of time to ascertain various assumptions such as changes is process design or infrastructure components. This results in considerable effort and long testing times. None of the currently available validation tools provide the capability of automatically verifying the validity of a process design against the technical and business landscape of the customer. In addition, the currently available validation systems are not capable of sensing changes in the process design or infrastructure components and automatically verifying the process design against only the occurred change. Also, in the event of negative validation results, the current validation systems do not provide any technical suggestions. Such suggestions may enable a user to tweak the process design or an infrastructure component in order to achieve positive validation results.

SUMMARY OF THE INVENTION

Embodiments of the invention are generally directed to a method and system for process design validation. A process validation is first triggered. A process design is validated against a technical infrastructure component and if a negative result is achieved as a result of process design validation, suggestions are generated in order to achieve a positive result.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for process design validation. A process validation is first triggered. A process design is validated against a technical infrastructure component and if a negative result is achieved as a result of process design validation, suggestions are generated in order to achieve a positive result.

Figure 1:
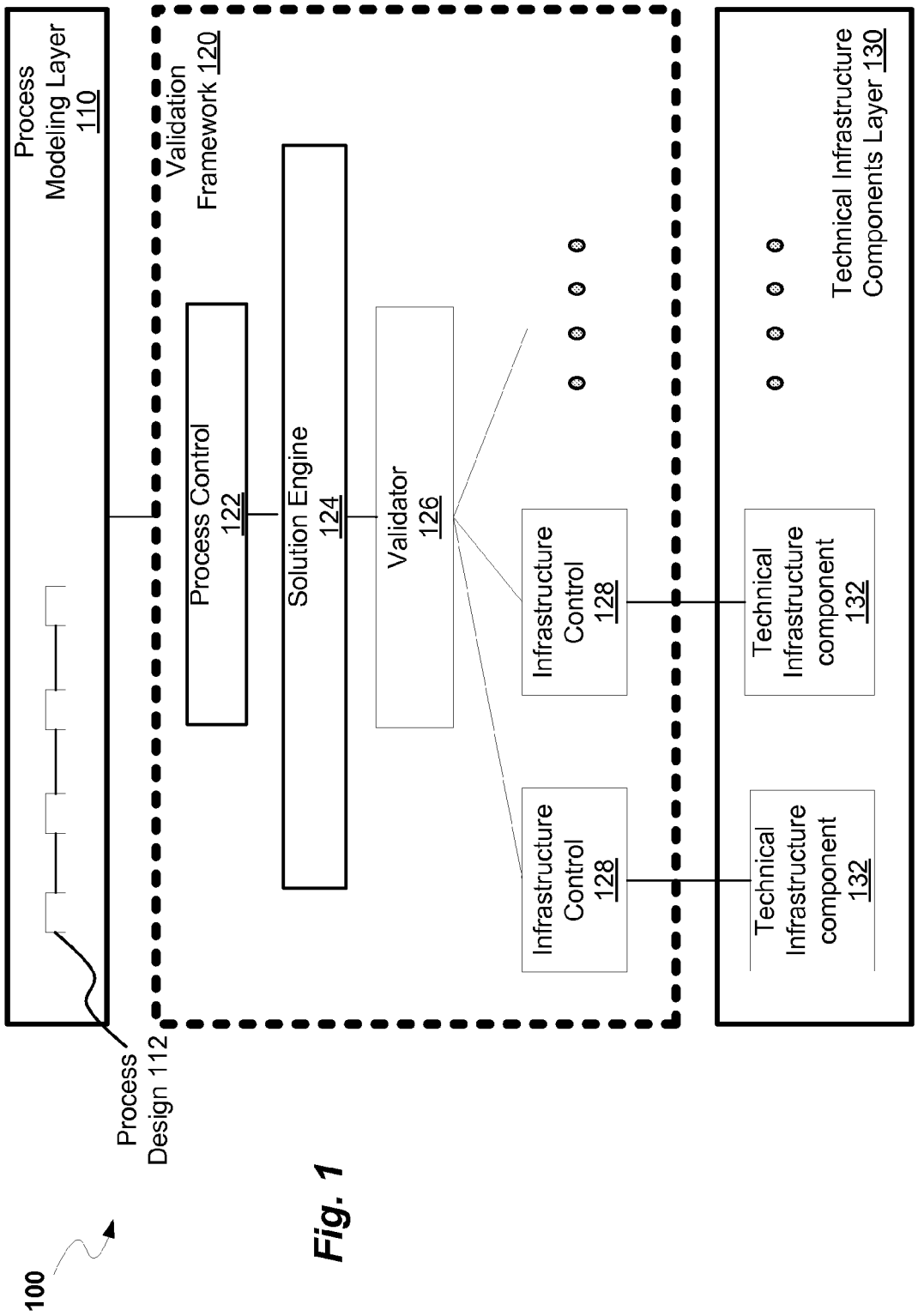
FIG. 1 is a functional block diagram of a system for validating a process design according to an embodiment of the invention.

FIG. 1 is a functional block diagram of a system 100 for validating a process design 112 according to an embodiment of the invention. Process modeling layer 110 allows the creation of a number of process designs 112 that may run across organizations. Process design 112 typically includes business processes, software processes, electronic design processes, production processes and the like.

According to an embodiment of the invention process design 112 uses enterprise services provided by a number of software modules (not shown). The enterprise services are typically provided by business objects. These business objects provide the individual participating services for a consolidated enterprise service. All the individual participating services generally run over the technical landscape of an organization. The technical landscape usually includes a number of technical infrastructure components 132 such as an authorization framework, a process agent framework, a rule definition framework and an organizational structure framework. Technical infrastructure components 132 are part of technical infrastructure components layer 130. Technical infrastructure components 132 essentially provide the specification and configuration of the organization's business and technical landscape. All processes of the organization must adhere to these specification and configurations.

Validation framework 120 is responsible for receiving process design 112 from process modeling layer 110, checking process design 112 against technical infrastructure components 132 and providing results. Process control 122 constantly listens to process modeling layer 110 for the creation of a new process design 112 or a change in existing process design 112. Listening basically refers to monitoring for changes. Process control 122 invokes validation framework 120 responsive to the creation of new process design 112 or a change in process design 112. Alternatively, validation framework 120 may be invoked manually by a user using a user interface. Solution engine 124 generates logical queries based upon process design 112 and communicates the logical queries to validator 126. The logical queries are generated in order to check the validity of each aspect of process design 112 against one or more technical infrastructure components 132 being used by such aspect. Validator 126 channelizes each logical query to an appropriate infrastructure control 128. Each infrastructure control 128 is connected to at least one technical infrastructure component 132. Infrastructure controls 128 communicate the logical queries to technical infrastructure components 132 and retrieve the results. The results from all technical infrastructure components 132 are then communicated back to solution engine 124. Solution engine 124 collates and compiles all the received results and displays the results to the user.

According to an embodiment of the invention, in the event of a change in the already existing process design 112, solution engine 124 generates logical queries based only upon the occurred change. These logical queries are then communicated through validator 126 to an appropriate infrastructure control 128. Infrastructure controls 128 retrieve results to the logical queries from technical infrastructure components 132. The retrieved results are then communicated to solution engine 124 which effectively displays the effects of the change in the process design to the user.

According to another embodiment of the invention, in the event of a change in existing process design 112, the user may choose to either validate the entire process design 112 or just the change that has occurred to process design 112 against the technical and business landscape of the organization.

According to another embodiment of the invention, infrastructure controls 128 listen to any change in corresponding technical infrastructure components 132 connected to each of them. Validation framework 120 is invoked in response to the change in any of the technical infrastructure components 132. A change list is generated by each of the infrastructure controls 128 indicating the change occurred in technical infrastructure components 132. The change lists from each of the infrastructure controls 128 are communicated to solution engine 124. Solution engine 124 generates logical queries based upon the change lists and communicates the logical queries to process control 122. Process control 122 retrieves results of the logical queries from process modeling layer 110 and communicates the results back to solution engine 124. Solution engine 124 collates and compiles the results and displays the effect of the change in technical infrastructure components 132 on process design 112.

According to another embodiment of the invention, in the event of no positive results being achieved to the queries, solution engine 124 generates possible remedies in order to achieve positive results. The remedies may include suggestions for making process design 112 changes or changes to technical infrastructure components 132.

An example of validation of a change in process design 112 against the technical and business landscape of the organization is the organization re-engineering process design 112 to streamline its process. For example, an organization wants to streamline a purchase order approval process by removing approval authorization from managers. Validation framework 120 may check only this change in process design 112 and show the impact of such a change on. For example, an authorization for approving a purchase order may have to be removed from manager role. In addition, validation framework 120 may provide possible remedies such as adding a new role with authorization for approving a business process.

An example of validating a process design 112 against a change occurred in technical infrastructure components 132 is the organization deciding to put a new position of a buying manager and assigning the role of buying request approver to the buying manager position. The validation framework 120 may create a change list indicating the change and validate process design 112 against the change only. Validation framework 120 may thus show the impact of the change on the current working process. In addition, validation framework 120 may suggest possible remedies such as a change in the binding of the approval step in process design 112 from current to the newly created position of buying manager.

Figure 2:
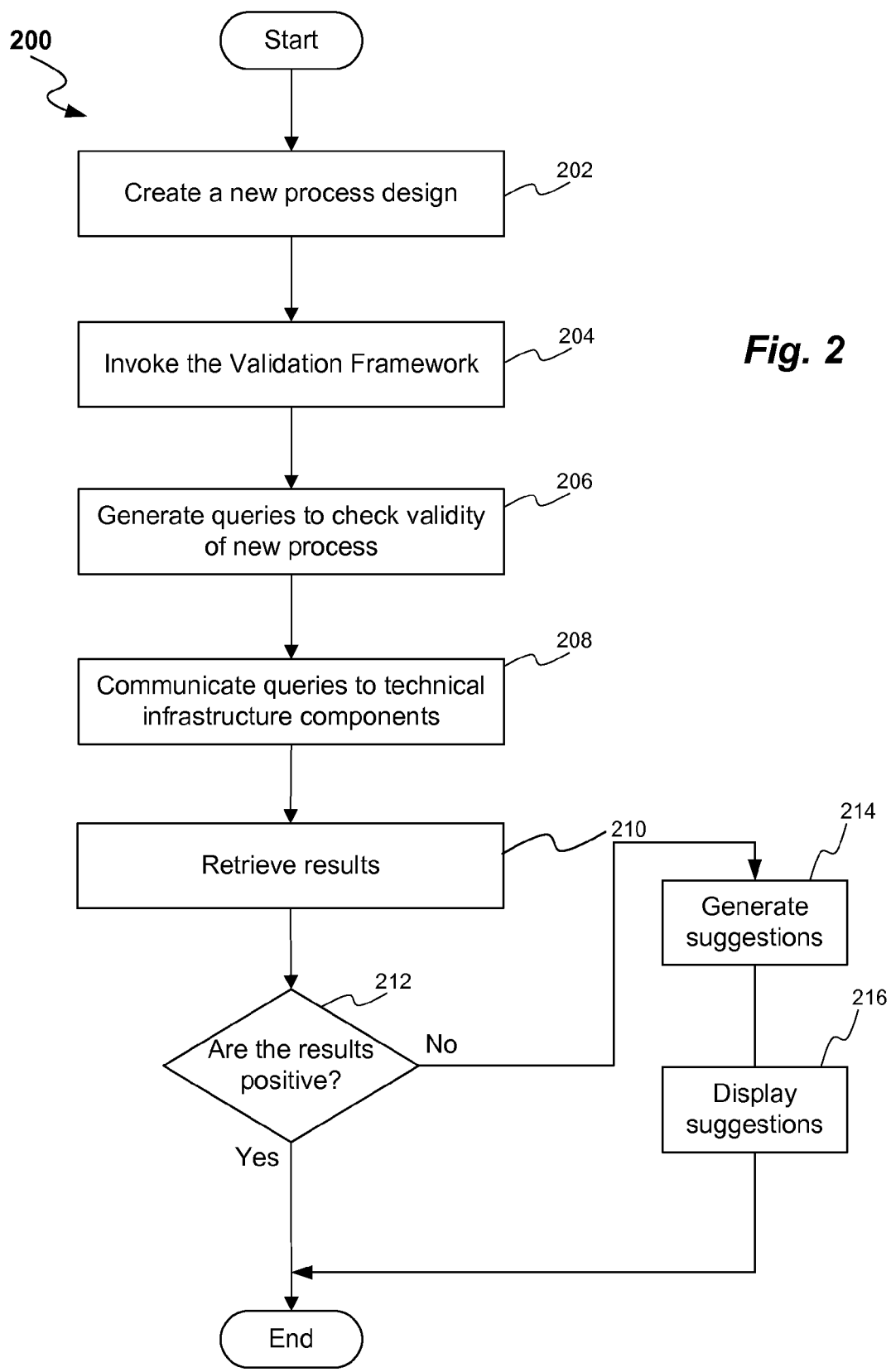
FIG. 2 is a flow diagram of a process for validating a new process design according to an embodiment of the invention.

FIG. 2 is a flow diagram of a process 200 for validating a new process design 112 according to an embodiment of the invention. In process block 202, new process design 112 is created. Validation framework 120 is invoked in process block 204. Process 200 then moves to process block 206, where solution engine 124 generates logical queries to check validity of the new process design against a set of technical infrastructure components. 132 In process block 208, logical queries are communicated to technical infrastructure components 132. The results are retrieved in process block 210 and communicated to solution engine 124. In decision block 212, if the results are not positive, process 200 moves to process block 214 wherein suggestions are generated by solution engine 124 for possible remedies. In process block 216, the suggestions are then displayed to the user through a user interface. Process 200 is then terminated. If the results are positive in decision block 212, then process 200 is terminated.

Figure 3:
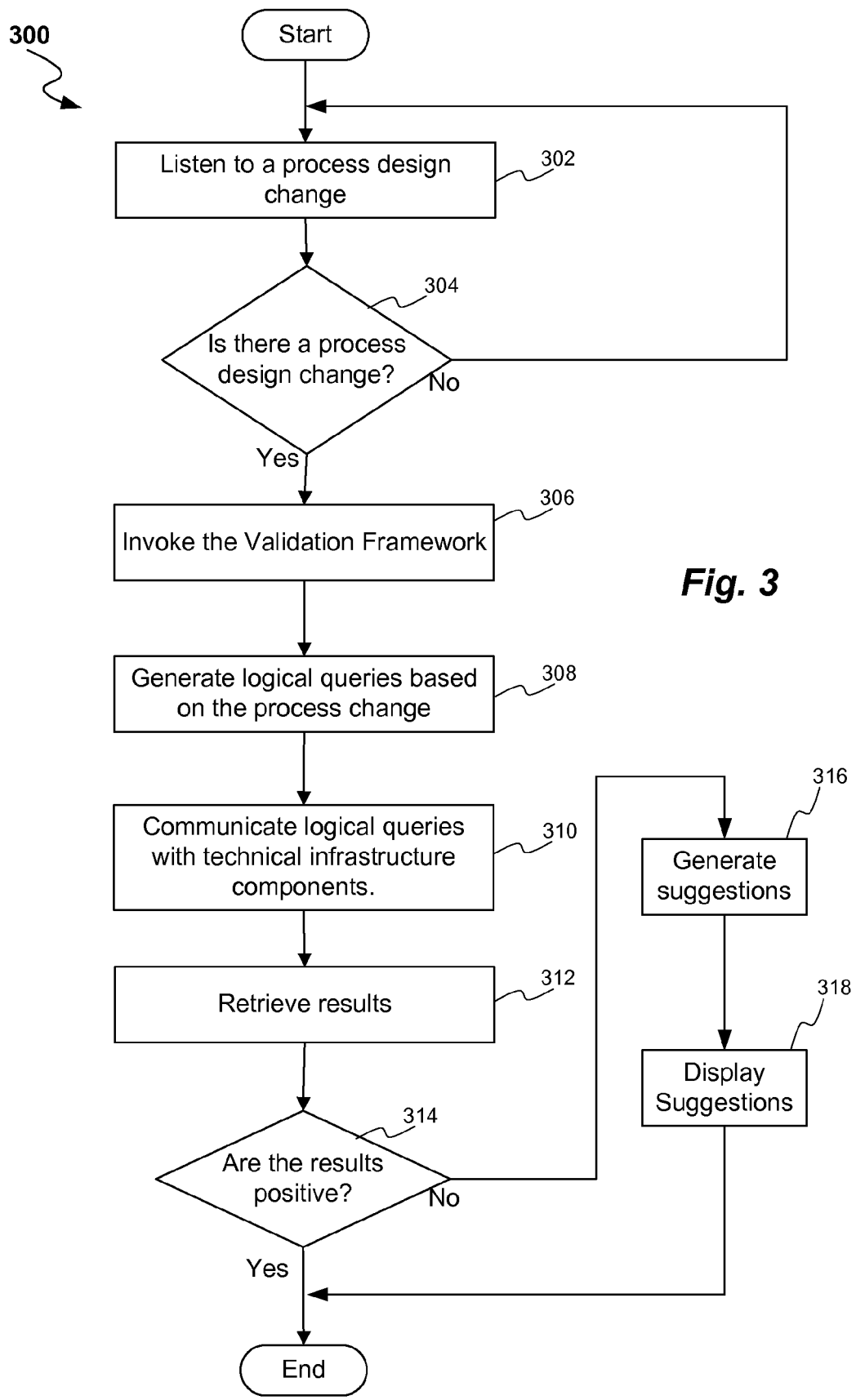
FIG. 3 is a flow diagram of a process for validating an existing process design in response to a change in the process design according to an embodiment of the invention.

FIG. 3 is a flow diagram of a process 300 for validating an existing process design in response to a change in process design 112 according to an embodiment of the invention. In process block 302, process control 122 listens to any change in process design 112. In decision block 304, if there is no change in process design 112, process 300 moves back to process block 302. If there is no change in process design 112, process 300 moves to process block 302. If there is a change in process design 112, process 300 moves to process block 306 wherein validation framework 120 is invoked. In process block 308, logical queries are generated by solution engine 124 based upon the change in process design 112. In process block 310, logical queries are communicated to technical infrastructure components 132. In process block 312 the results are retrieved and communicated to solution engine 124. In decision block 314, if the results are not positive, process 300 moves to process block 316 wherein suggestions are generated for possible remedies. In process block 318 suggestions are displayed to the user through a user interface. Process 300 is then terminated. If the results are positive, then process 300 is terminated.

Figure 4:
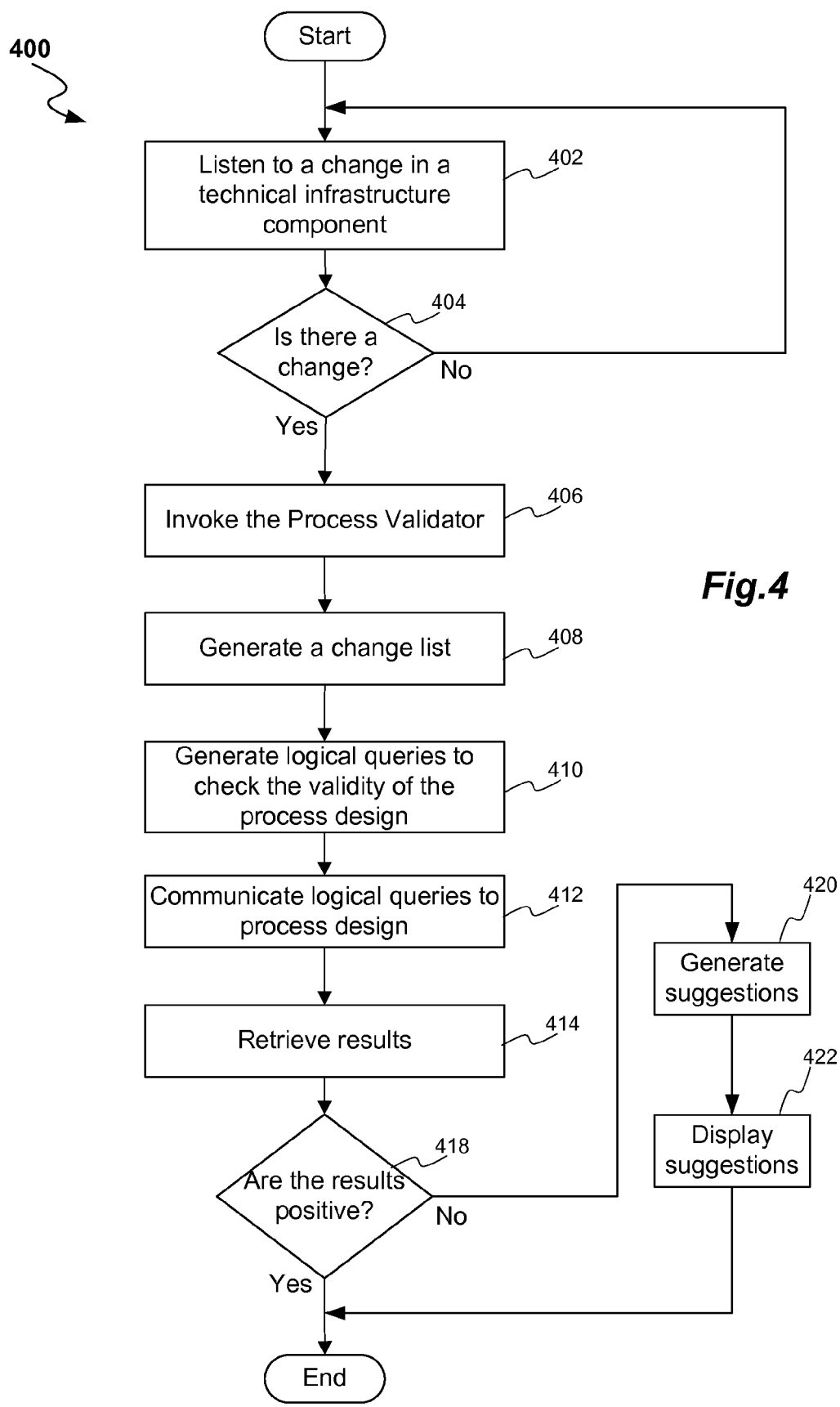
FIG. 4 is a flow diagram of a process for validating a process design in response to a change in a technical infrastructure component according to an embodiment of the invention.

FIG. 4 is a flow diagram of a process 400 for validating a process design 112 in response to a change in a technical infrastructure component 132 according to an embodiment of the invention. In process block 402, infrastructure control 128 listens to any change in any of the technical infrastructure components 132. In decision block 404, if there is no change in technical infrastructure components 132, process 400 moves back to process block 402. If a change in technical infrastructure components 132 occurs, process 400 moves to process block 406 wherein process validator 120 is invoked. In process block 408, a change list is generated by each of the technical infrastructure components 132 indicating any change in technical infrastructure components 132. The change lists are communicated to solution engine 124 and logical queries are generated to check the validity process design 112 against the change list in process block 410. The logical queries are communicated to process modeling layer 110 in process block 412. In process block 414 results are retrieved. In decision block 418, if there are no positive results, process 400 moves to process block 420 wherein suggestions are generated for possible remedies. The suggestions are then displayed to the user through a user interface in process block 422. Process 400 is then terminated. If the results are positive, process 400 is terminated.

Figure 5:
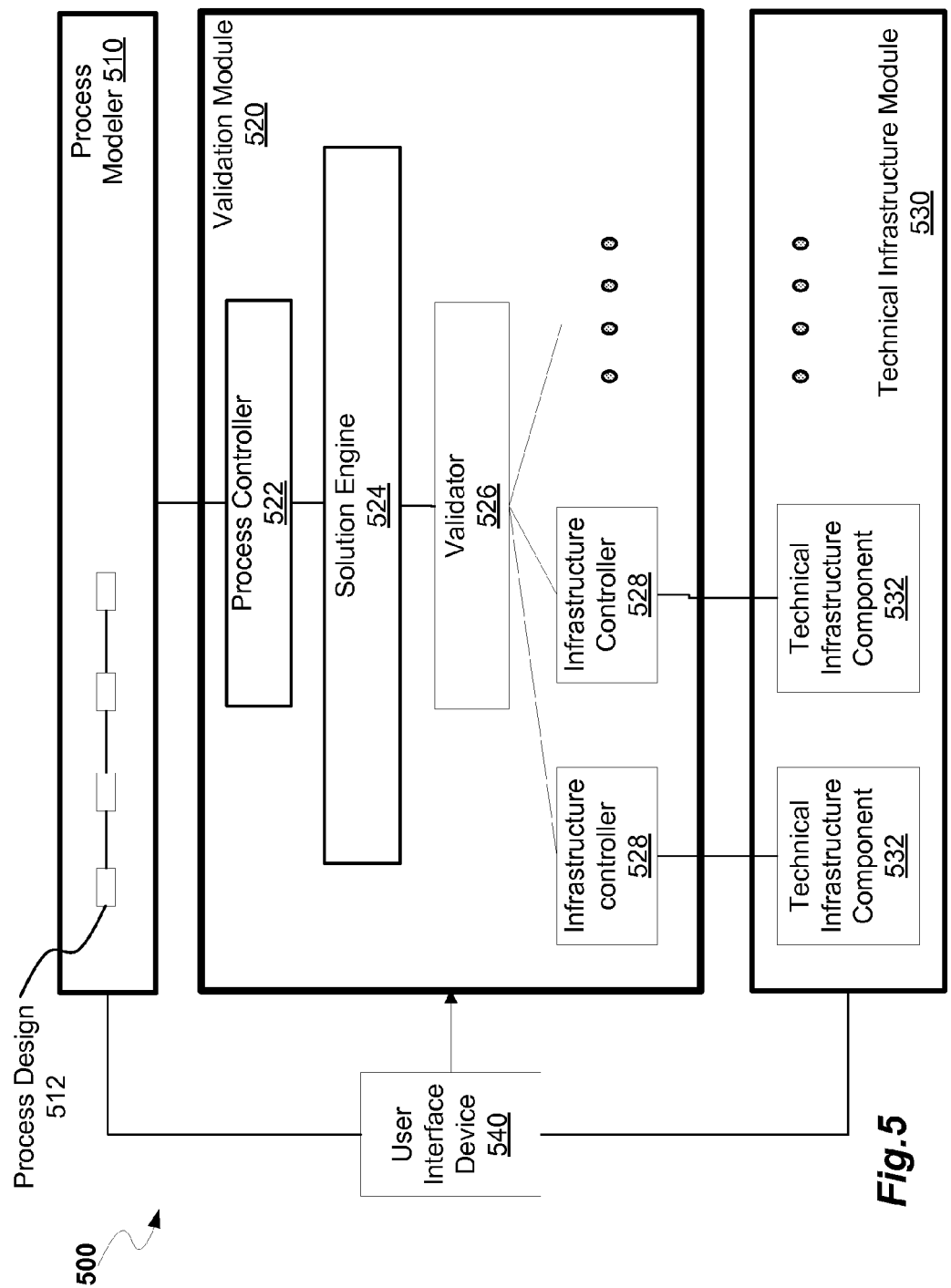
FIG. 5 is a block diagram of a system for process design validation useful for implementing the invention according to an embodiment of the invention.

FIG. 5 is a block diagram of a system 500 for process design validation useful for implementing the invention according to an embodiment of the invention. System 500 includes process modeler 510, validation module 520, technical infrastructure module 530 and user interface device 540. The process modeler 510 allows the creation of process design 512 that generally runs across organizations. Process design 512 typically includes business processes, software processes, electronic design processes, production processes and the like.

According to an embodiment of the invention process design 512 uses enterprise services provided by a number of software modules (not shown). The enterprise services are typically provided by business objects. These business objects provide individual participating services for a consolidated enterprise service. All the individual participating services generally run over the technical landscape of an organization. The technical landscape usually includes a number of technical infrastructure components 532. All technical infrastructure components 532 are stored by technical infrastructure module 530. Technical infrastructure components 532 essentially provide the specification and configuration of the organization's business and technical landscape. All processes of the organization must adhere to these specification and configurations. Technical infrastructure components 532 may include authorization framework, process agent framework, rule definition framework and organizational structure framework.

Validation module 520 is responsible for receiving process design 512 from process modeler 510, checking the process design 512 against the technical infrastructure components 532 and providing results. Validation module 520 includes process controller 522, solution engine 524, validator 526 and a number of infrastructure controllers 528. Process controller 522 constantly listens to process modeler 510 for the creation of a new process design 512 or a change in process design 512. Process controller 522 invokes validation module 520 responsive to the creation of a new process design 512 or a change in process design 512. Alternatively, validation module 520 may be invoked manually by a user through user interface device 540. Solution engine 524 receives process design 512 as an input, generates logical queries based upon process design 512 and communicates these logical queries to validator 526. The logical queries are generated in order to check the validity of each aspect of process design 512 against one or more technical infrastructure components 532 being used by such aspect. Validator 526 channelizes each logical query to an appropriate infrastructure controller 528. Each infrastructure controller 528 is connected to a technical infrastructure component 532. Infrastructure controllers 528 communicate the logical queries to corresponding technical infrastructure components 532 and fetch the results. The results from all the technical infrastructure components 532 are then communicated back to solution engine 524. Solution engine 524 collates and compiles all the received results and displays the results to the user through user interface device 540.

According to an embodiment of the invention, in the event of a change in an already existing process design 512, solution engine 524 generates logical queries based only upon the occurred change. These logical queries are then communicated through validator 526 to appropriate infrastructure controller 528. Infrastructure controllers 528 retrieve results to the logical queries from infrastructure components 532. The retrieved results are then communicated to solution engine 524 that effectively displays the effects of the change in process design 512 to the user through user interface device 540.

According to another embodiment of the invention, in the event of a change in existing process design 512, the user may choose to either validate the entire process design 512 or just the change that has occurred to process design 512 against the technical and business landscape of the organization.

According to another embodiment of the invention, infrastructure controllers 528 listen to any change in corresponding technical infrastructure component 532 connected to each of them. Validation module 520 is invoked in response to the change in one or more of the technical infrastructure components 532. Technical infrastructure components 532 may be changed by a user using user interface device 540. A change list is generated by each of the infrastructure controllers 528 indicating the change occurred in technical infrastructure components 532. The change lists from each infrastructure controller 528 is communicated to solution engine 524. Solution engine 524 generates logical queries based upon the change lists and communicates the logical queries to process controller 522. Process controller 522 retrieves results of the logical queries from the process modeler 510 and communicates the results back to solution engine 524. The solution engine 524 collates and compiles the results and displays the effect of the change in technical infrastructure components 532 on process design 512 to the user through user interface device 540.

According to another embodiment of the invention, in the event of no positive results being achieved to the logical queries, solution engine 524 generates possible remedies in order to achieve positive results. The remedies may include suggestions for making changes to process design 512 or changes to technical infrastructure components 532.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. The invention may be downloaded as a computer program which may be transferred from a remote computer (e.g., a server) to a requesting computer (e.g., a client) by way of a communication link (e.g., a modem or network connection).

What is claimed is:

1. A computer-implemented method for validating a process design corresponding to a technical infrastructure component, comprising:
   triggering a validation framework for initiating an evaluation of the process design;
   based upon a modification in the process design, generating a logical query for evaluating the modified process design corresponding to the technical infrastructure component;
   based upon the logical query, retrieving a result from the technical infrastructure component by comparing the modified process design with the corresponding technical infrastructure component; and
   collating the retrieved result with the modified process design for generating a result of evaluation.

2. The computer-implemented method of claim 1, wherein triggering the validation framework occurs responsive to an action selected from a group comprising of a modification in the process design and a modification in the technical infrastructure component.

3. The computer-implemented method of claim 2, wherein the modification in the process design comprises a creation of a new process design or a modification in an existing process design.

4. The computer-implemented method of claim 1 further comprising:
   generating a change list containing one or more modifications in the technical infrastructure component; and
   evaluating the process design corresponding to the change list.

5. The computer-implemented method of claim 1 further comprising:
   generating a logical query based upon a modification in the technical infrastructure component; and
   retrieving a result of the logical query from the corresponding process design by comparing the modified technical infrastructure component with the corresponding process design.

6. The computer-implemented method of claim 1, wherein the technical infrastructure component is selected from a group comprising of an authorization framework, a process agent framework, a rule definition framework and an organizational structure framework.

7. The computer-implemented method of claim 1, wherein the result of evaluation further comprises a positive evaluation result for a positive evaluation and a negative evaluation result for a negative evaluation.

8. The computer-implemented method of claim 7 further comprising:
   generating an evaluation suggestion for the negative evaluation result, as a remedy to modify the process design or to modify the technical infrastructure component; and
   initiating the evaluation for the modified process design or the modified technical infrastructure component.

9. The computer-implemented method of claim 8 further comprising:
   displaying the evaluation suggestion on a user interface; and
   based upon a user selection of modifying the process design or modifying the technical infrastructure component, initiating the corresponding evaluation.

10. The computer-implemented method of claim 1, wherein generating a logical query further comprises: receiving a user input for evaluating a part of the process design which is modified.

11. A computer system configured to validate a process design corresponding to a technical infrastructure component, comprising:
    a user interface device configured to receive a modification in the process design;
    a process controller configured to monitor the modification in the process design and to trigger a validation module;
    the validation module coupled to the user interface, configured to evaluate the process design based upon the modification in the process design;
    a solution engine coupled to the process controller, configured to generate a logical query for evaluating the modified process design corresponding to the technical infrastructure component;
    an infrastructure controller coupled to the solution engine, configured to retrieve a result from the technical infrastructure component based upon the logical query, by comparing the modified process design with the technical infrastructure component;
    the solution engine configured to collate the retrieved result with the modified process design for generating a result of evaluation; and
    the user interface device configured to display the result of evaluation.

12. The computer system of claim 11 further comprising a validator coupled to the solution engine and the infrastructure controller configured to distribute the logical query to the infrastructure controller.

13. The computer system of claim 11 further comprising a process modeler coupled to the process controller to generate the process design.

14. The computer system of claim 11 further comprising a technical infrastructure module coupled to the validation module to store the technical infrastructure component.

15. The computer system of claim 11, wherein the user interface device is configured to receive a modification in the technical infrastructure component.

16. An article of manufacture comprising a machine-accessible medium that provides instructions that, when executed by a machine, cause the machine to perform operations comprising:
    triggering a validation framework for initiating an evaluation of the process design;
    based upon a modification in a process design, generating a logical query for evaluating the modified process design corresponding to a technical infrastructure component;
    based upon the logical query, retrieving a result from the technical infrastructure component by comparing the modified process design with the corresponding technical infrastructure component; and
    collating the retrieved result with the modified process design for generating a result of evaluation.

17. The article of manufacture of claim 16, wherein triggering a validation framework occurs responsive to an action selected from a group comprising of a modification in the process design and a modification in the technical infrastructure component.

18. The article of manufacture of claim 17, wherein the modification in the process design comprises a creation of a new process design or a modification of an existing process design.

19. The article of manufacture of claim 16 further providing instructions which when executed by the machine cause the machine to perform further operations comprising:
    generating a change list containing one or more modifications in the technical infrastructure component; and evaluating the process design corresponding to the change list.

20. The article of manufacture of claim 16 further comprises:

generating a logical query based upon a modification in the technical infrastructure component; and retrieving a result of the logical query from the technical infrastructure component by comparing the modified infrastructure component with the corresponding process design.

21. The article of manufacture of claim 16 further comprises:

generating a logical query based upon a modification in the technical infrastructure component; and retrieving a result of the logical query from the corresponding process design by comparing the modified technical infrastructure component with the corresponding process design.

22. The article of manufacture of claim 16, wherein the technical infrastructure component is selected from a group comprising of an authorization framework, a process agent framework, a rule definition framework and an organizational structure framework.

* * * * *